US012143805B2

(12) United States Patent
Laaksonen et al.

(10) Patent No.: US 12,143,805 B2
(45) Date of Patent: Nov. 12, 2024

(54) RENDERING SPATIAL AUDIO CONTENT

(71) Applicant: Nokia Technologies Oy, Espoo (FI)

(72) Inventors: Lasse Juhani Laaksonen, Tampere (FI); Jussi Artturi Leppanen, Tampere (FI); Arto Juhani Lehtiniemi, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 156 days.

(21) Appl. No.: 17/959,486

(22) Filed: Oct. 4, 2022

(65) Prior Publication Data

US 2023/0109110 A1 Apr. 6, 2023

(30) Foreign Application Priority Data

Oct. 6, 2021 (EP) .................................... 21201165

(51) Int. Cl.
*H04S 7/00* (2006.01)

(52) U.S. Cl.
CPC .......... *H04S 7/304* (2013.01); *H04S 2400/03* (2013.01); *H04S 2400/11* (2013.01)

(58) Field of Classification Search
CPC ....................................................... H04S 7/304
See application file for complete search history.

(56) References Cited

U.S. PATENT DOCUMENTS

2007/0242834 A1 10/2007 Coutinho et al. ............ 381/71.8
2010/0040240 A1 2/2010 Bonanno .......................... 381/74
2012/0283015 A1 11/2012 Bonanno .......................... 463/35
2015/0235645 A1* 8/2015 Hooks ................... G10L 19/008 704/500
2018/0020297 A1 1/2018 Udesen et al. .................. 25/554
2020/0197825 A1* 6/2020 Bear ................... A63F 13/5255
2020/0329332 A1 10/2020 Ehara et al. ...................... 7/304

OTHER PUBLICATIONS

"Information technology—High efficiency coding and media delivery in heterogeneous environments—Part 3: 3D audio", International Standard, ISO/IEC 23008-3, Oct. 15, 2015, 439 pages.

* cited by examiner

*Primary Examiner* — Ping Lee
(74) *Attorney, Agent, or Firm* — Harrington & Smith

(57) ABSTRACT

An apparatus including circuitry configured for: receiving first audio content associated with a first apparatus; receiving second audio content associated with a second apparatus; simultaneously rendering the first audio content and the second audio content to a user via a head-mounted audio output system configured for spatial audio rendering, wherein the first audio content is rendered as spatial audio content and the second audio content is downmixed to downmixed content and the downmixed content is rendered.

13 Claims, 5 Drawing Sheets

RENDERING SPATIAL AUDIO CONTENT

TECHNOLOGICAL FIELD

Embodiments of the present disclosure relate to rendering spatial audio content.

BACKGROUND

Spatial audio content 50 comprises one or more audio sources, each having a flexible position in an audio space. The audio space can be two or three dimensional.

Sometimes it is desirable to render simultaneously to a listener audio content that comes from two different apparatus.

This can be confusing to the listener if the audio content comprises spatial audio content.

BRIEF SUMMARY

According to various, but not necessarily all, embodiments there is provided an apparatus comprising means for:

receiving first audio content associated with a first apparatus;

receiving second audio content associated with a second apparatus;

simultaneously rendering the first audio content and the second audio content to a user via a head-mounted audio output system configured for spatial audio rendering, wherein the first audio content is rendered as spatial audio content and the second audio content is downmixed to downmixed content and the downmixed content is rendered.

In some, but not necessary all, examples the apparatus is configured to render the first audio content as spatial audio content within an audio space, the audio space remaining in a fixed relationship relative to the first apparatus, wherein the audio space is moved in response to tracked movement, relative to the first apparatus, of the head-mounted audio output system.

In some, but not necessary all, examples the apparatus is configured to provide the head-mounted audio output system, wherein the apparatus is a head-mounted apparatus to be worn by the user and is configured for dynamically tracking movement of the user's head.

In some, but not necessary all, examples the apparatus is configured to render the first audio content as spatial audio content within an audio space, wherein the audio space is moved in response to data from the first apparatus tracking movement of the head-mounted audio output system.

In some, but not necessary all, examples the first audio content received is first spatial audio content associated with first spatial audio information defining variable positions of multiple first audio sources, wherein in a first state the apparatus is configured to render the first spatial audio content using the first spatial audio information to produce the multiple first audio sources at the variable positions defined by the first spatial audio information.

In some, but not necessary all, examples the second audio content comprises multiple second audio sources, and wherein in a first state, the apparatus is configured to downmix the second audio content to downmixed content and to render the downmixed content.

In some, but not necessary all, examples in a first state the second audio content is downmixed to a single audio source and rendered as the single audio source.

In some, but not necessary all, examples the apparatus is configured to render the second audio content as spatial audio content within a second audio space, the second audio space remaining in a fixed relationship relative to the second apparatus, wherein the second audio space is moved in response to tracked movement of the head-mounted audio output system.

In some, but not necessary all, examples the apparatus is configured to:

while in a first state, simultaneously render the first audio content and the second audio content to a user via the head-mounted audio output system configured for spatial audio rendering, wherein the first audio content is rendered as spatial audio content and the second audio content is downmixed to downmixed content and the downmixed content is rendered;

and while in a second state, simultaneously render the first audio content and the second audio content to the user via the head-mounted audio output system configured for spatial audio rendering, wherein the second audio content is rendered without downmixing; and switch between the first state and the second state.

In some, but not necessary all, examples, in the second state, the second audio content is rendered in its native form.

In some, but not necessary all, examples the apparatus is configured cause switching between the first state and the second state in dependence upon detected user actions.

In some, but not necessary all, examples the apparatus is configured to, in the second state, downmix the first audio content to downmixed audio content and to render the downmixed audio content.

In some, but not necessary all, examples the first audio content comprises multiple audio sources, wherein in the second state, the first audio content is downmixed to a single audio source and rendered as the single audio source.

In some, but not necessary all, examples the second audio content received is second spatial audio content associated with second spatial audio information defining variable positions of multiple second audio sources, wherein in the second state the apparatus is configured to render the second spatial audio content using the second spatial audio information to produce the multiple second audio sources at the variable positions defined by the second spatial audio information.

In some, but not necessary all, examples the second audio content is stereo audio content, wherein the apparatus is configured to, in the second state, render the second audio content as stereo audio content.

According to various, but not necessarily all, embodiments there is provided a method comprising:

simultaneously rendering first audio content associated with a first apparatus and second audio content associated with a second apparatus to a user via a head-mounted shared audio output system configured for spatial audio rendering, wherein in the first state the first audio content is rendered as spatial audio content and the second audio content is downmixed to downmixed content and the downmixed content is rendered.

According to various, but not necessarily all, embodiments there is provided a computer program comprising program instructions for causing an apparatus to perform at least the following:

simultaneously rendering first audio content associated with a first apparatus and second audio content associated with a second apparatus to a user via a head-mounted audio output system configured for spatial audio rendering, wherein the first audio content is rendered as spatial audio content, and the second audio content is downmixed to downmixed content and the downmixed content is rendered.

According to various, but not necessarily all, embodiments there is provided a system comprising the apparatus, the first apparatus and the second apparatus, wherein the first apparatus is configured to track movement of a head of a user and the second apparatus is configured to track movement of a head of a user, wherein when the user is focusing on the first apparatus, the apparatus is in the first state and the first apparatus is used for tracking the head of the user; and when the user is focusing on the second apparatus, the apparatus is in the second state and the second apparatus is used for tracking the head of the user.

According to various, but not necessarily all, embodiments there is provided examples as claimed in the appended claims.

BRIEF DESCRIPTION

Some examples will now be described with reference to the accompanying drawings in which.

DETAILED DESCRIPTION

Figure 1:
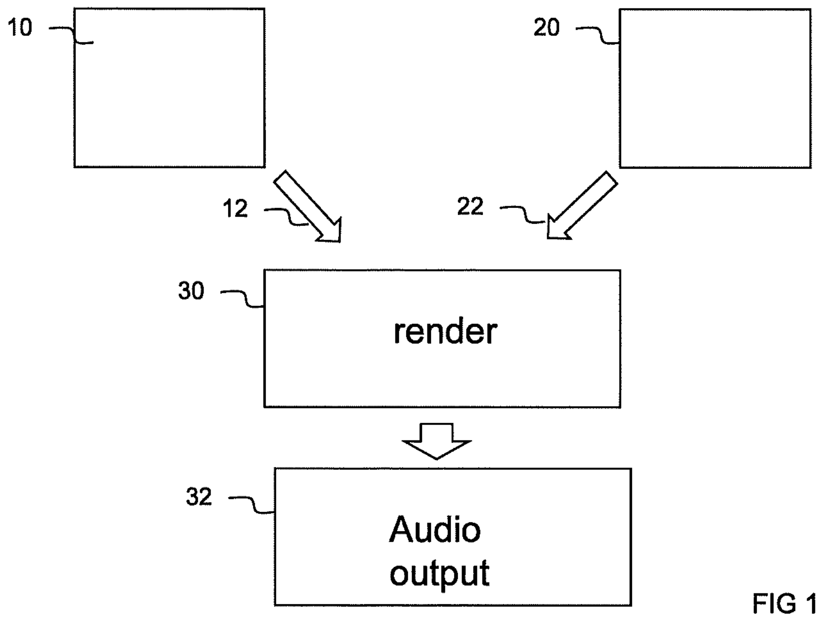
FIG. 1 shows an example of an apparatus for controlling simultaneous rendering of audio content from multiple different sources via a single audio output system, where the audio content from one or more of the different sources is spatial audio content.

The following description and figures describe various examples of an apparatus 30 comprising means for:

receiving first audio content 12 associated with a first apparatus 10;

receiving second audio content 22 associated with a second apparatus 20;

simultaneously rendering the first audio content 12 and the second audio content 22 to a user via a head-mounted audio output system configured for spatial audio rendering, wherein the first audio content 12 is rendered as spatial audio content and the second audio content 22 is downmixed to downmixed content and the downmixed content is rendered.

The following description and figures describe various examples of an apparatus 30 comprising means for:

receiving first audio content 12 associated with a first apparatus 10;

receiving second audio content 22 associated with a second apparatus 20;

while in a first state 41, simultaneously rendering the first audio content 12 and the second audio content 22 to a user 2 via a head-mounted audio output system 32 configured for spatial audio rendering 50, wherein the first audio content 12 is rendered as spatial audio content 50 and the second audio content 22 is downmixed 60 to downmixed content 62 and the downmixed content 62 is rendered; and while in a second state 42, simultaneously rendering the first audio content 12 and the second audio content 22 to the user 2 via the head-mounted audio output system 32 configured for spatial audio rendering 50, wherein the second audio content 22 is rendered without downmixing; and switching 43 between the first state 41 and the second state 42.

FIG. 1 illustrates an example of an apparatus 30.

The apparatus 30 is configured to receive first audio content 12 associated with a first apparatus 10 and to receive second audio content 22 associated with a second apparatus 20.

The apparatus 30 is configured, in first and second states 41, 42, to simultaneously render the first audio content 12 and the second audio content 22 to a user via a head-mounted audio output system 32 which is configured for spatial audio rendering.

In a first state 41, the second audio content 22 is downmixed 60 to downmixed content 62 and that downmixed content 62 is rendered.

In a second state 42, the second audio content 22 is no longer downmixed 60 and the second audio content 22 is rendered without downmixing.

In some examples, the second audio content 22 is rendered as spatial audio content.

There is only a single audio output system 32 shared by the first apparatus 10 and the second apparatus 20. A user is rendered the first audio content 12 only via the audio output system 32 and is rendered the second audio content 22 only via the same audio output system 32. The rendering of the first audio content 12 and the second audio content 22 via the same shared audio output system 32 is simultaneous (contemporaneous).

One or more of the apparatus 10, 20, 30, 32 can be configured to dynamically track movement of a head of a user, dynamically track a gaze direction of a user, or detect a gaze or orientation of a user towards the first apparatus 10 and/or the second apparatus 20. Movement of a head can be measured using sensors at the head, for example accelerometers, gyro meters etc. Movement of a head can be measured at a distance using a camera to capture images and then processing captured images using computer vision. Movement of an eye of a user can be measured at a distance using a camera to capture images and then processing captured images using computer vision.

In some examples, gaze or orientation of a user towards the first apparatus 10 and/or the second apparatus 20 can be used as a condition for switching between first and second states.

In some examples, head-tracking can be performed or assisted by apparatuses the apparatus 10, 20 towards which the user is oriented and can change with user orientation.

Thus, in some examples, the first apparatus 10 is configured to track movement of a head of a user and the second apparatus 20 is configured to track movement of a head of a user. When the user 2 is focusing on the first apparatus 10, the apparatus 30 is in the first state 41 and the first apparatus 10 is used for tracking the head of the user 2. When the user 2 is focusing on the second apparatus 20, the apparatus 30 is in the second state 42 and the second apparatus 20 is used for tracking the head of the user 2.

In some but not necessarily all examples, the first audio content 12 is associated with visual content being contemporaneously displayed at the first apparatus 10

In some but not necessarily all examples, the second audio content 22 is associated with visual content being contemporaneously displayed at the second apparatus 20

For simplicity of explanation the examples described relate to two states 41, 42. However, there can be additional states. One or more of these states can also share the characteristic that while there is simultaneous rendering of content from different apparatuses, at most only content from one apparatus is rendered as full multi-source spatial audio content 50 without downmixing.

For simplicity of explanation the examples described relate to two apparatus 10, 20 that provide respective audio content. However, there can be additional apparatus providing additional audio content. While there is simultaneous rendering of content from the different apparatuses, at most only content from one of the multiple apparatuses is rendered as full multi-source spatial audio content 50 without downmixing.

Figure 2:
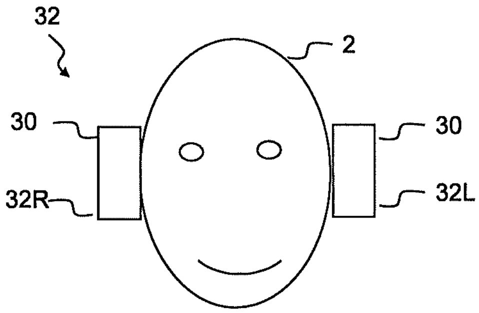
FIG. 2 shows an example of the apparatus integrated with the single audio output system.

FIG. 2 illustrates an example of a suitable audio output system 32. However, other audio output systems 32 can be used. The audio output system 32 is configured to render spatial audio.

In this example, the audio output system 32 and the apparatus 30 are combined into a single system.

In this example, the audio output system 32 is a head-mounted system. The head-mounted system is configured to be worn by the user 2. It could for example, comprise a set of ear-mounted speaker systems, one $32_L$ for the left ear of a user 2 and one $32_R$ for the right ear of a user 2. The ear-mounted speaker systems $32_L$, $32_R$ can be provided as in-ear or on-ear or over-ear arrangements. The ear-mounted speaker systems can be a headset, ear pods, etc.

The head-mounted apparatus 30 can be configured for dynamically tracking movement of a head of a user 2. In some examples, the head-mounted apparatus 30 can be configured for dynamically tracking a gaze direction of the user 2. The head-mounted apparatus 30 can, for example, be configured to detect a gaze or orientation of a user 2 towards an apparatus 10, 20 that is providing audio content 12, 22.

Figure 3:
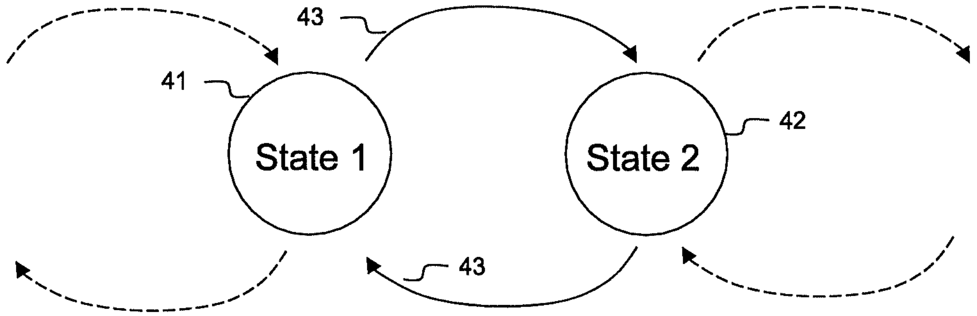
FIG. 3 shows an example of a state machine for the apparatus.

FIG. 3 illustrates an example of a state machine configured for use by the apparatus 30. The state machine comprises a plurality of states including at least a first state 41 and a second state 42. The state machine can transition 43 between states.

Figure 4:
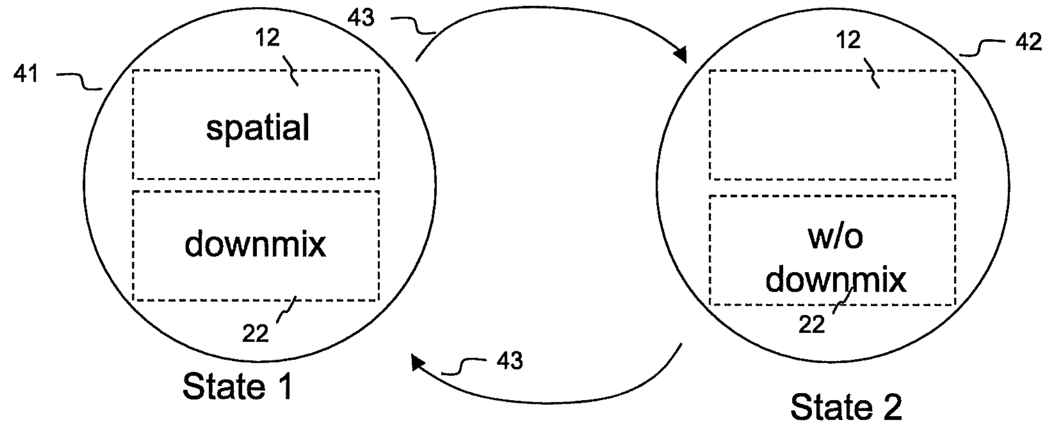
FIG. 4 shows an example of states of the state machine where each state enables simultaneous rendering of audio content from multiple different sources via a single audio output system.

FIG. 4 illustrates aspects of the state machine in more detail.

In the first state 41, the apparatus 30 is configured to simultaneously render the first audio content 12 and the second audio content 22 to a user 2 via a (head-mounted) audio output system 32 configured for spatial audio rendering 50, where:

(i) only one of the first audio content 12 and the second audio content 22 is rendered as full spatial audio content 50 without downmixing, (ii) the first audio content 12 is rendered as full spatial audio content 50 without downmixing, and (iii) the second audio content 22 is downmixed 60 to downmixed content 62 and the downmixed content 62 is rendered.

In the second state 42, the apparatus 30 is configured to simultaneously render the first audio content 12 and the second audio content 22 to the user 2 via the (head-mounted) audio output system 32 configured for spatial audio rendering 50, where:

(i) only one of the first audio content 12 and the second audio content 22 is rendered as full spatial audio content 50 without downmixing, and (ii) the second audio content 22 is rendered without downmixing;

In the second state 42, the second audio content 22 is no longer downmixed 60 and the second audio content 22 is rendered without downmixing. In some examples, the second audio content 22 is rendered as spatial audio content.

The switching 43 between the first state 41 and the second state 42 can be dependent upon detected user 2 actions. For example, it can be dependent upon how a user 2 is focusing attention. For example, it can be dependent upon where a user 2 is directing their gaze or their orientation.

For example, if the user 2 starts to focus on the first apparatus 10 or starts to direct their prolonged gaze or orientation towards the first apparatus 10, then the state machine can transition 43 to the first state 41. In some examples the state machine can transition 43 from the second state 42 to the first state 41.

For example, if the user 2 starts to focus on the second apparatus 20 or starts to direct their prolonged gaze or orientation towards the second apparatus 20, then the state machine can transition 43 to the second state 42. In some examples the state machine can transition 43 from the first state 41 to the second state 42.

Figure 5:
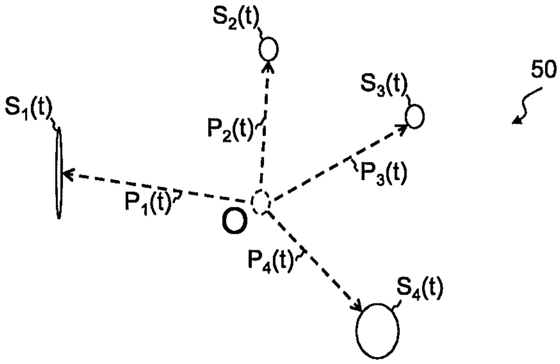
FIG. 5 shows an example of positioned audio sources in spatial audio content.

FIG. 5 illustrates an example of rendering of spatial audio content 50. The spatial audio content 50 comprises multiple audio sources $S_i$, each having a position $p_i$ in an audio space. The audio space can be two or three dimensional.

It is possible for a set of N audio sources $S_i$ to be located at N different positions $p_i$ in the audio space, where N is one or more. Spatial audio supports positioning such that the number M of possible positions $p_i$ for audio sources can be very much greater than the number N of audio sources.

An audio sources $S_i$, can change with time t. An audio sources $S_i(t)$ is an audio source that can but does not necessarily vary with time. An audio source $S_i(t)$ is a source of audio content and the audio content can but does not necessarily vary with time. An audio source $S_i(t)$ is a source of audio content that has intensity and spectral characteristics that can but do not necessarily vary with time. An audio source $S_i(t)$ is a source of audio content that can, optionally have certain sound effects such as reverberation, perceived width of audio source etc that can but do not necessarily vary with time.

A position $p_i$ of an audio source $S_i$, can vary with time t. A position $p_i(t)$ is a position that can but does not necessarily vary with time. The position $p_i$ can be a vector position from an origin O that is, it defines distance and direction. The position $p_i$ can be defined using any suitable co-ordinate system.

The origin O can, for example, be a fixed position in a real space occupied by the user 2, or, a (moveable) position of the user 2 who can move within the real space occupied by the user 2, or, a (movable) position of one of the apparatus 10, 20, 30, 32 which can move within the real space occupied by the user 2.

In some object-based examples, each audio source Si can have an independently defined position pi(t). The spatial audio content 50 is defined by a set of N positioned audio sources {Si(t), pi(t)}. In scene-based audio representations (e.g. ambisonics or parametric spatial audio (e.g., metadata-assisted spatial audio—MASA)) typically have audio sources that have a position listener is able to detect, but the user can also perceive diffuse sound when listening. Channel-based audio can have independently defined static positions for the channels, and an audio source can then be created by rendering audio content via one or more channels at any given time. There can be more than one audio source present in each channel.

A characteristic of spatial audio content 50 is that different audio sources $S_i$ can move through space relative to each other. If the number M of possible positions $p_i$ for audio sources is sufficiently high, the different audio sources $S_i$ can move continuously through space relative to each other.

Certain characteristics of spatial audio content 50, for example the variable positions $p_i(t)$ can be defined using spatial audio information. The spatial audio information can be an integrated part of the spatial audio content 50 or can be separate data. Thus, the spatial audio content 50 is associated with spatial audio information defining variable positions of multiple audio sources.

Audio content 12, 22 that is spatial audio content 50 is associated with spatial audio information defining variable positions of multiple audio sources. The apparatus 30 is capable of rendering the spatial audio content 50 using the spatial audio information to produce the audio source(s) at the variable position(s) defined by the spatial audio information.

Stereo audio content comprises only two audio sources $S_L$, $S_R$ which are rendered, respectively, at a left speaker and a right speaker.

Mono audio content comprises only one audio source S which is rendered from one or more speakers. Mono audio content can be spatial audio content.

Figure 6A:
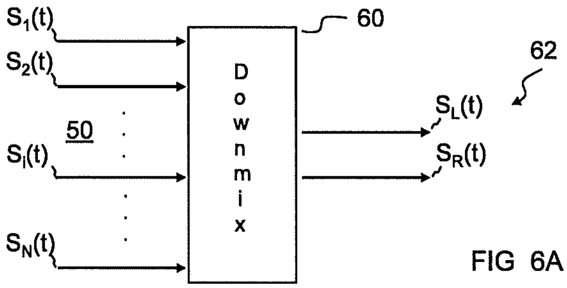
FIGS. 6A & 6C shows downmixing of audio content.
Figure 6B:
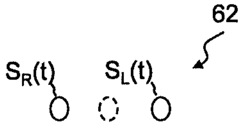
FIGS. 6B & 6D show rendering of the downmixed audio content of FIG. 6A, 6C.

It is possible, for example as illustrated in FIGS. 6A & 6B, to downmix 60 spatial audio content 50 that comprises multiple (N) audio sources $S_i$, each having a position $p_i$ in an audio space to downmixed content 62 that has fewer audio sources.

FIG. 6A, schematically illustrates downmixing spatial audio content that comprises multiple (N) audio sources $S_i$, each having a position $p_i$ in an audio space, to stereo audio content (downmixed content 62) comprising only two audio sources $S_L$, $S_R$. FIG. 6B illustrates rendering of the two audio sources $S_L$, $S_R$, which are rendered, respectively, at a left speaker and a right speaker.

Different algorithms can be used for downmixing. For example, each audio source $S_i$ can be assigned to a left channel or a right channel based on its position $p_i$. The audio sources $S_i$ assigned to the left channel are combined (e.g. a weighted summation) to form the left audio source $S_L$. The audio sources $S_i$ assigned to the right channel are combined (e.g. a weighted summation) to form the right audio source $S_R$. It some examples, it may be desirable to weight the contribution of different audio sources $S_i$ differently, for example, based on position, distance, frequency or some other characteristic such as speech analysis or metadata. An audio source can be excluded by using a zero weighting.

The two audio sources $S_L$, $S_R$, can have a fixed position relative to each other and an origin O. The origin O (and the two audio sources $S_L$, $S_R$,) can also have a fixed position relative to a real space occupied by the user 2, or, a fixed position relative to the user 2 who can move within the real space occupied by the user 2, or, a fixed position relative to one of the apparatus 10, 20, 30, 32 which can move within the real space occupied by the user 2.

Figure 6C:
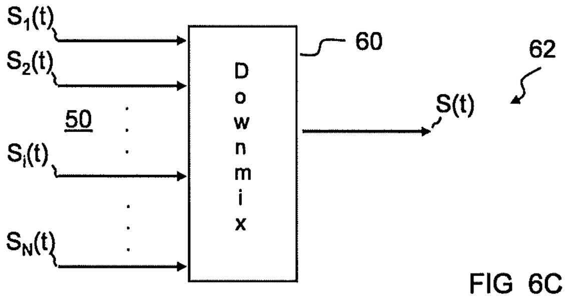
Figure 6D:
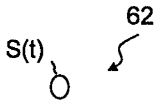

FIG. 6C, schematically illustrates downmixing spatial audio content 50 that comprises multiple (N) audio sources $S_i$, each having a position $p_i$ in an audio space, to mono audio content downmixed content 62) comprising only one audio source S. FIG. 6D illustrates rendering of the mono audio source S at a speaker.

Different algorithms can be used for downmixing. For example, the audio sources $S_i$ can be combined (e.g. a weighted summation) to form the mono audio source S. It some examples, it may be desirable to weight the contribution of different audio sources $S_i$ differently, for example, based on position, distance, frequency or some other characteristic such as speech analysis or metadata. An audio source can be excluded by using a zero weighting.

The audio source S can have a fixed position relative to a real space occupied by the user 2, or, a fixed position relative to the user 2 who can move within the real space occupied by the user 2, or, a fixed position relative to one of the apparatus 10, 20, 30, 32 which can move within the real space occupied by the user 2.

Features Common Between Embodiments

Figure 7:
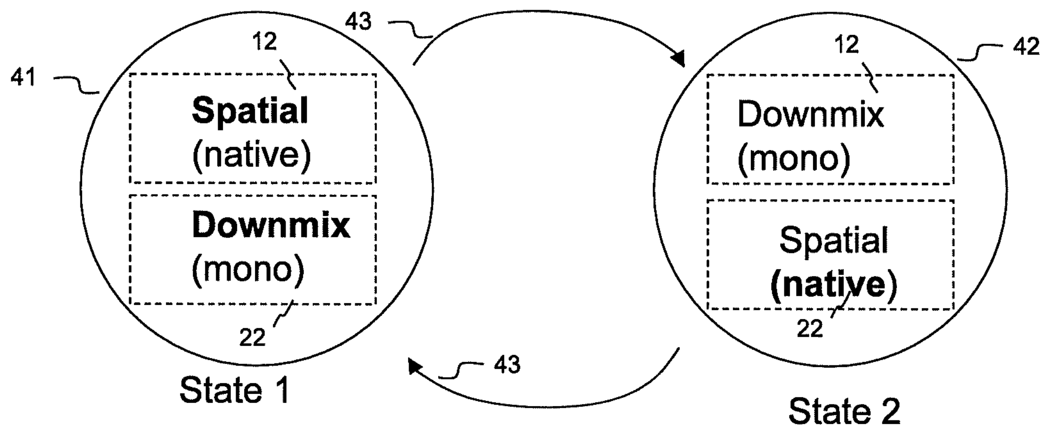
FIG. 7 shows an example of the state machine of FIG. 4 where the audio content from two different sources is spatial audio content.
Figure 8:
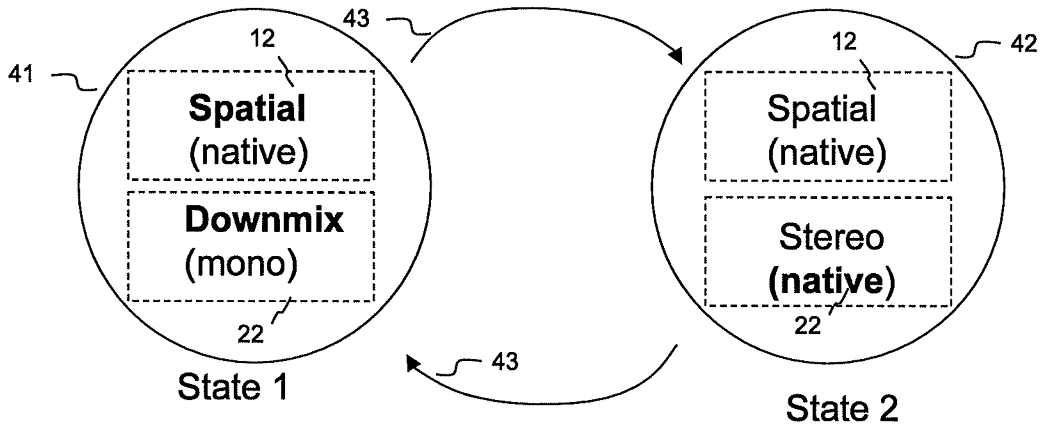
FIG. 8 shows an example of the state machine of FIG. 4 where the audio content has one or more audio sources.

Reference is now made to FIGS. 7 and 8, which extend the example of FIG. 4.

In these examples, the first audio content 12 is full multi-source spatial audio content 50 without downmixing. The second audio content 22 has multiple audio sources. In the example of FIG. 7, the second audio content 22 is full multi-source spatial audio content 50 without downmixing and in the example of FIG. 8, the second audio content 22 is stereo audio content.

In the first state 41, the first audio content 12 is rendered as native audio content, that is in its native form without downmixing, as spatial audio content 50. The second audio content 22 is downmixed to downmixed content 62 and the downmixed content 62 is rendered, in this example as mono audio content.

In the second state 42, the second audio content 22 is rendered as native audio content, that is in its native form without downmixing. In the example of FIG. 7 it is rendered as full spatial audio content 50 and in the example of FIG. 8 it is rendered as stereo audio content.

The first audio content 12 is first spatial audio content 50 associated with first spatial audio information defining variable positions $p_i$ of multiple first audio sources $S_i$. In the first state 41 the apparatus is configured to render the first spatial audio content 50 using the first spatial audio information to produce the multiple first audio sources $S_i$ at the variable positions $p_i$ defined by the first spatial audio information.

At least one of the first audio content 12 and the second audio content 22 is rendered in its native form in the first state 41. At least one of the first audio content 12 and the second audio content 22 is rendered in its native form in the second state 42.

Referring to FIG. 7, in a first embodiment, the first audio content 12 is first spatial audio content 50 associated with first spatial audio information defining variable positions $p_i$ of multiple first audio sources $S_i$ and the second audio content 22 is second spatial audio content 50 associated with second spatial audio information defining variable positions $p_j$ of multiple second audio sources $S_j$.

In the first state 41 the apparatus 30 is configured to render the first spatial audio content 50 using the first spatial audio information to produce the multiple first audio sources $S_i$ at the variable positions $p_i$ defined by the first spatial audio information. Thus, the first audio content 12 is rendered in native form as first spatial audio content 50. The second audio content 22 is downmixed to downmixed content 62 and the downmixed content 62 is rendered, in this example as mono audio content (not as native, spatial audio content 50).

In the second state 42 the apparatus is configured to render the second spatial audio content 50 using the second spatial audio information to produce the multiple second audio sources $S_j$ at the variable positions $p_j$ defined by the second spatial audio information. Thus, the second audio content 22 is rendered in native form as second spatial audio content 50. The first audio content 12 is downmixed to downmixed content 62 and the downmixed content 62 is rendered, in this example as mono audio content (not as native, spatial audio content 50).

Referring to FIG. 8, in a second embodiment, the first audio content 12 is first spatial audio content 50 associated with first spatial audio information defining variable positions $p_i$ of multiple first audio sources $S_i$. The second audio content 22 is stereo content.

In both the first state 41 and the second state 42, the apparatus 30 is configured to render the first spatial audio content 50 using the first spatial audio information to produce the multiple first audio sources $S_i$ at the variable positions $p_i$ defined by the first spatial audio information. Thus, the first audio content 12 is rendered as first spatial audio content 50 without downmixing.

In the first state 41, the second audio content 22 is downmixed to downmixed content 62 and the downmixed content 62 is rendered, in this example as mono audio content (not as native, stereo audio content).

In the second state 42, the apparatus 30 is configured to render the second spatial audio content 50 in its native form as stereo content.

Figure 9A:
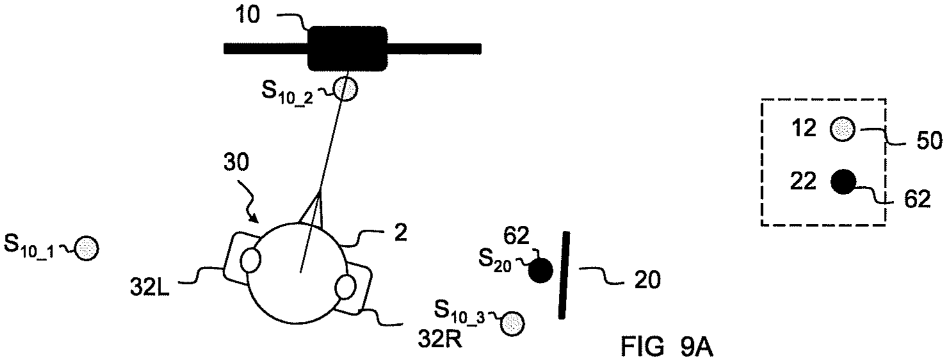
FIGS. 9A & 9B show an example of the first embodiment.
Figure 9B:
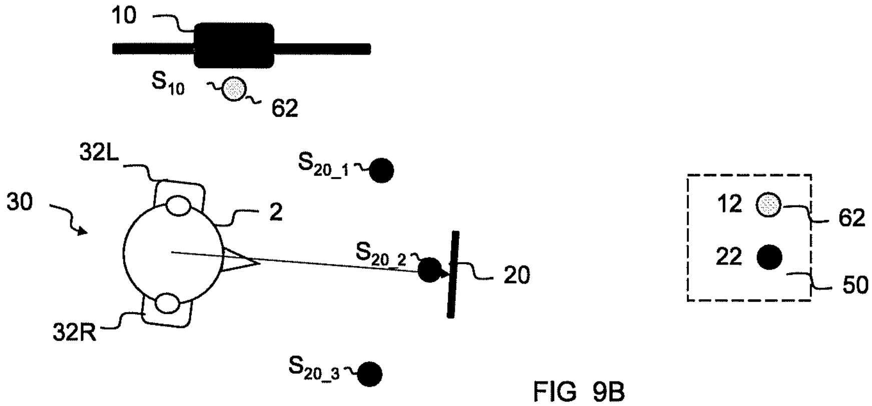

FIGS. 9A & 9B illustrate an example of the first embodiment, for the first state (FIG. 9A)) and the second state (FIG. 9B). The apparatus 30 is as previously described with reference to FIG. 2. In this example, but not necessarily all examples, the first apparatus 10 is a television and the first audio content 12 is television audio and the second apparatus 20 is a computer tablet and the second audio content 22 is computer audio.

The first audio content 12, associated with the first apparatus 10, is first spatial audio content associated with first spatial audio information defining variable positions of multiple first audio sources $S_{10\_i}$ and the second audio content, associated with the second apparatus 20, is second spatial audio content associated with second spatial audio information defining variable positions of multiple second audio sources $S_{20\_j}$.

In the first state (FIG. 9A), the apparatus 30 is configured to render the first spatial audio content 50 using the first spatial audio information to produce the multiple first audio sources $S_{10\_i}$ at the variable positions defined by the first spatial audio information. Thus, the first audio content 12 is rendered in native form as first spatial audio content 50. The second audio content 22 is downmixed to downmixed content 62 and the downmixed content 62 is rendered, in this example as mono audio content $S_{20}$ (not as native, spatial audio content 50).

In the second state (FIG. 9B), the apparatus 30 is configured to render the second spatial audio content using the second spatial audio information to produce the multiple second audio sources $S_{20\_j}$ at the variable positions defined by the second spatial audio information. Thus, the second audio content 22 is rendered in native form as second spatial audio content 50. The first audio content 12 is downmixed to downmixed content 62 and the downmixed content 62 is rendered, in this example as mono audio content $S_{10}$ (not as native, spatial audio content 50).

In this example, the user 2 is consuming two different spatial audio contents 12, 22 one from his television 10 and one from his tablet 20. The user 2 hears both audio content 12, 22 but how they are rendered and which device is used for headtracking is determined based on which content the user is focusing on.

Headtracking for spatial audio can refer to the rendering of audio content as spatial audio content within an audio space that is fixed in real space and through which the user turns and/or moves. The audio space remains in a fixed relationship relative to the first apparatus, and the audio space is moved in response to tracked movement, relative to the first apparatus, of the head-mounted audio output system. Thus, if a user wearing a headset turns to the right, the audio space defined by the headset is turned to the left by the same amount so that it remains fixed in real space. Headtracking can be performed by the head-mounted audio output system 30 detecting its own movement or by an apparatus 10, 20 detecting movement of the user's head or head-mounted audio output system 30. In the latter case, the apparatus 10, 20 can provide headtracking data to the apparatus 30.

In some examples, when the first audio content 12 is rendered, it is rendered as spatial audio content within a first audio space that remains in a fixed relationship relative to the first apparatus 10 associated with the first audio content 12. The first audio space can be moved in response to tracked movement of the head audio output system so that it remains in a fixed relationship relative to the first apparatus 10.

In some examples, when the second audio content 22 is rendered, it is rendered as spatial audio content within a second audio space that remains in a fixed relationship relative to the second apparatus 20 associated with the second audio content 22. The second audio space can be moved in response to tracked movement of the head-mounted audio output system so that it remains in a fixed relationship relative to the second apparatus 20.

In FIG. 9A, the user is focusing on the first audio content 12 from his television 10. This causes the system to render the audio to the user as follows: The first audio content 12 from the television is rendered normally as spatial audio content 50 surrounding the user 2, with the front direction for the spatial audio content 50 being set to towards the display of the television 10. Headtracking is done by the television 10 (in combination with the apparatus 30). The television 10 can send data tracking movement of the head-mounted audio output system 30. Moving the television 10 will cause the front-direction of the spatial audio content 50 to change so that it always faces the television 10.

The audio content 22 from the tablet 20 is rendered as a mono object $S_{20}$ from the direction of the tablet 20. The tablet direction can be determined as the direction the tablet 20 was in prior to the user switching his focus to the television 10. This allows the user 2 to be able to consume both audio content 12, 22 simultaneously, without them interfering too much with each other.

When the user 2 switches focus towards the tablet 20, the system renders the audio to the user as shown in FIG. 9B. The first audio content 12 from television is now rendered as a mono object $S_{10}$ and the second audio content 22 from tablet is rendered as full spatial audio content 50 with the forward direction set towards the tablet 20. At this point the tablet 20 takes over the head-tracking duties from the television 10. This is because the user 2 is now facing the tablet 20 and more reliable head-tracking data is obtained from that apparatus (camera sees user's face better and user is more likely closer to the apparatus 20). The tablet 20 can send data tracking movement of the head-mounted audio output system 30. Furthermore, the apparatus the user is not concentrating on (first apparatus 10) may enter power saving mode etc. and lose head-tracking capabilities. Furthermore, the content that is spatial should be tracked with low latency. This is achieved by switching the tracking to the apparatus that is rendering the spatial content (i.e. the one that the user is focusing on). Moving the tablet 20 will cause the front-direction of the spatial audio content 50 to change so that it always faces the tablet 20. When the focus was on the television 10 (FIG. 9A), the moving of the tablet 20 did not have any effect on the content rendering).

Figure 10A:
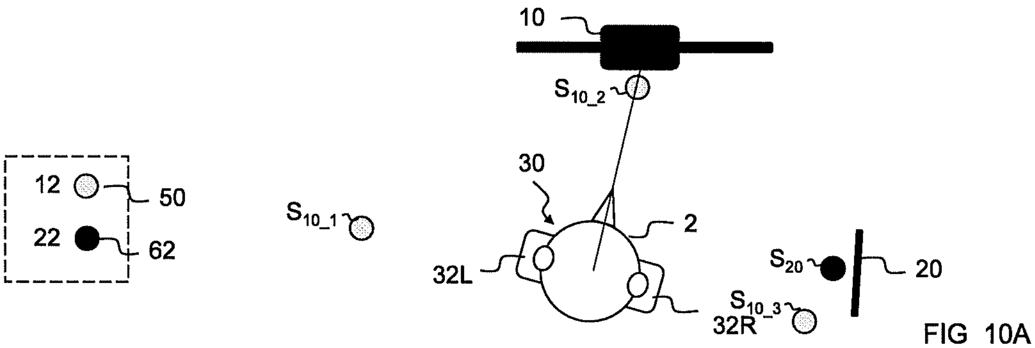
FIGS. 10A & 10B show an example of the second embodiment.
Figure 10B:
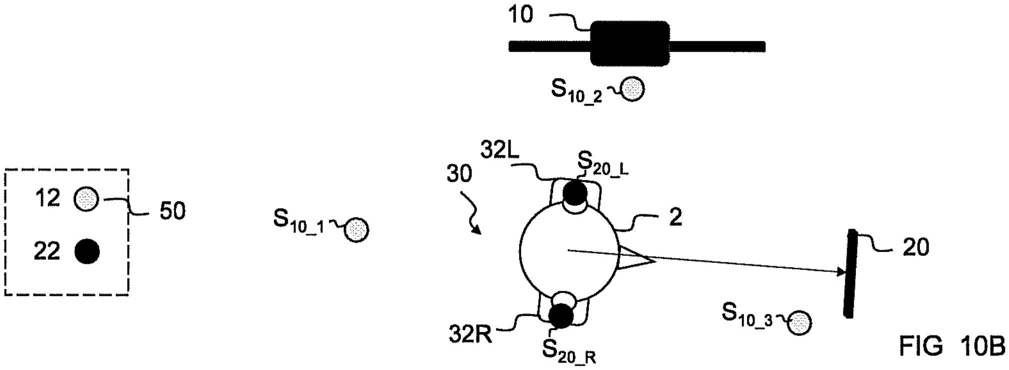

FIGS. 10A & 10B illustrate an example of the second embodiment, for the first state (FIG. 9A)) and the second state (FIG. 9B). The apparatus 30 is as previously described with reference to FIG. 2. In this example, but not necessarily all examples, the first apparatus 10 is a television and the first audio content 12 is television audio and the second apparatus 20 is a computer tablet and the second audio content 22 is computer audio.

The first audio content 12, associated with the first apparatus 10, is first spatial audio content 50 associated with first spatial audio information defining variable positions of multiple first audio sources $S_{10\_i}$ and the second audio content 22, associated with the second apparatus 20, is stereo content.

In the both the first state (FIG. 9A) and the second state (FIG. 9B), the apparatus 30 is configured to render the first spatial audio content 50 using the first spatial audio information to produce the multiple first audio sources $S_{10\_i}$ at the variable positions defined by the first spatial audio information. Thus, the first audio content 12 is rendered in native form as first spatial audio content 50.

In the first state (FIG. 10A), the second audio content 22 is downmixed to downmixed content 62 and the downmixed content 62 is rendered, in this example as mono audio content $S_{20}$ (not as native, stereo audio content).

In the second state 42 (FIG. 10B), the apparatus 30 is configured to render the second audio content 22 in its native form as stereo audio content. Stereo audio content comprises only two audio sources $S_L$, $S_R$ which are rendered, respectively, at a left speaker 32L and a right speaker 32R.

In this example, the user is consuming spatial audio content from his television 10 and stereo content from his tablet 20. The spatial audio content 50 is always rendered to the user 2 as spatial audio with the front-direction set to the apparatus providing the spatial audio, in this case the television 10. In this case, the apparatus providing the spatial audio performs the head-tracking of the user 2 regardless of which apparatus the user 2 is focusing on. This is because the other apparatus 20 may not have head-tracking available (as it is rendering only stereo content) and also that the spatial audio should stay aligned with the spatial audio providing apparatus (front-direction always towards it). The tracking apparatus can send data tracking movement of the head-mounted audio output system 30. When the user 2 is focusing on the apparatus providing the spatial audio content, the audio rendering is done in the same way as in the previous embodiment (FIG. 9A), but when the user is focusing on the apparatus 20 providing stereo content, the rendering is done as shown in FIG. 10B. The spatial audio content 12 from the television 10 is rendered as spatial audio and the stereo content 22 from the tablet is rendered as stereo audio content.

There can be two types of tracking. There is dynamic headtracking which can be used to control spatial audio rendering. This dynamic headtracking can, in some examples, switch between the different apparatuses 10, 20. However, in some examples, a location to which a mono downmix is rendered is based on position tracking of or between the apparatuses 10, 20 that provide the rendered audio content 12, 22. This tracking may not need to switch but can be carried out actively in the background by at least one of the apparatus 10, 20. Each device either performs this secondary tracking or receives information on secondary tracking from the other apparatus 10, 20. While this tracking is not directly audio tracking (headtracking), the result from it can be used in the audio co-rendering to modify the rendering accordingly. For example, the mono source $S_{20}$ is placed in the position of the second apparatus 20 or the mono source $S_{10}$ is placed in the position of the first apparatus 10

Thus, in some examples, the location to which a mono downmix $S_{10}$, $S_{20}$ is rendered is based on a relative position between the apparatus 10, 20 or the location and/or orientation of one of the apparatus 10, 20. For example, a position of the mono downmix $S_{10}$ can track with the position of the apparatus 10 (but not the user 2). For example, the position of the mono downmix $S_{20}$ can track with the position of the apparatus 20 (but not the user 2). This secondary tracking may not need to switch but can be carried out in the background.

Figure 11:
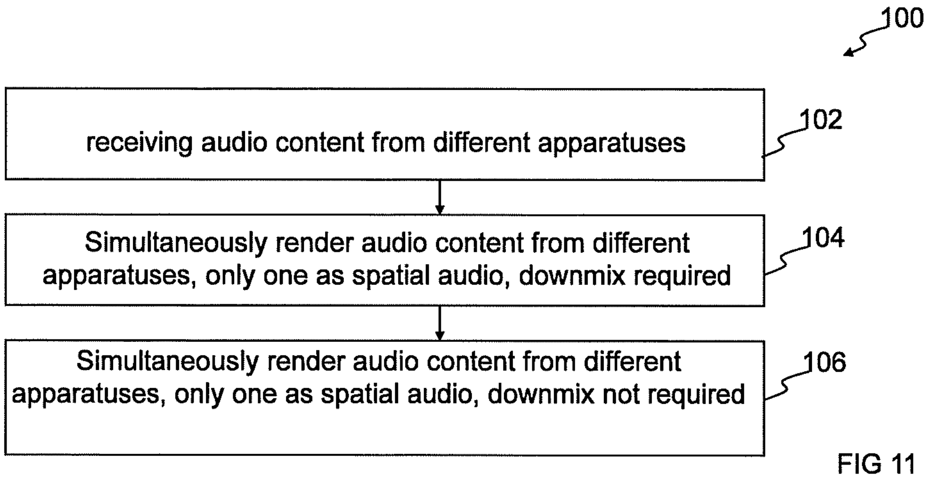
FIG. 11 shows a method in which downmixing of an audio source is switched on or off.

FIG. 11 illustrates an example of a method 100 for selective downmixing of audio content 12, 22 so that only audio content 12, 22 associated with one of multiple apparatuses 10, 20 is not downmixed and the other is downmixed.

The method 100 comprises at block 102, receiving different audio content associated with different apparatuses (e.g. first audio content 12 associated with a first apparatus 10; second audio content 22 associated with a second apparatus 20).

The method 100 comprises at block 104 simultaneously rendering the received different audio content (e.g. the first audio content 12 and the second audio content 22) to a user 2 via a head-mounted audio output system 32 configured for spatial audio rendering 50. At block 104 (first state) the first audio content is rendered as spatial audio content, and the second audio content is downmixed to downmixed content and the downmixed content is rendered.

At block 106 (first state) the second audio content is rendered without downmixing.

Figure 12:
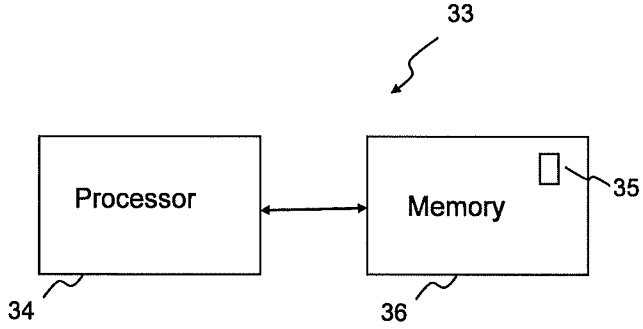
FIG. 12 shows an example of the apparatus.

FIG. 12 illustrates an example of a controller 33. Implementation of a controller 33 may be as controller circuitry. The controller 33 may be implemented in hardware alone, have certain aspects in software including firmware alone or can be a combination of hardware and software (including firmware).

As illustrated in FIG. 12 the controller 33 may be implemented using instructions that enable hardware functionality, for example, by using executable instructions of a computer program 35 in a general-purpose or special-purpose processor 34 that may be stored on a computer readable storage medium (disk, memory etc) to be executed by such a processor 34.

The processor 34 is configured to read from and write to the memory 36. The processor 34 may also comprise an output interface via which data and/or commands are output by the processor 34 and an input interface via which data and/or commands are input to the processor 34.

The memory 36 stores a computer program 35 comprising computer program instructions (computer program code) that controls the operation of the apparatus 30 when loaded into the processor 34. The computer program instructions, of the computer program 35, provide the logic and routines that enables the apparatus to perform the methods illustrated in FIGS. 3, 4, 7-9. The processor 34 by reading the memory 36 is able to load and execute the computer program 35.

The apparatus 30 therefore comprises:

at least one processor 34; and at least one memory 36 including computer program code the at least one memory 36 and the computer program code configured to, with the at least one processor 34, cause the apparatus 30 at least to perform:

simultaneously rendering first audio content associated with a first apparatus and second audio content associated with a second apparatus to a user via a head-mounted audio output system configured for spatial audio rendering, wherein in the first state the second audio content is downmixed to downmixed content and the downmixed content is rendered and the first audio content is rendered as spatial audio content.

The apparatus 30 therefore comprises:

at least one processor 34; and at least one memory 36 including computer program code the at least one memory 36 and the computer program code configured to, with the at least one processor 34, cause the apparatus 30 at least to perform:

switching between a first state and a second state, while simultaneously rendering first audio content associated with a first apparatus and second audio content associated with a second apparatus to a user via a head-mounted audio output system configured for spatial audio rendering, wherein in the first state the second audio content is downmixed to downmixed content and the downmixed content is rendered and the first audio content is rendered as spatial audio content and wherein in the second state the second audio content is rendered without downmixing.

Figure 13:
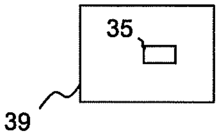
FIG. 13 shows an example of a computer program.

As illustrated in FIG. 13, the computer program 35 may arrive at the apparatus 30 via any suitable delivery mechanism 39. The delivery mechanism 39 may be, for example, a machine-readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 35. The delivery mechanism may be a signal configured to reliably transfer the computer program 35. The apparatus 30 may propagate or transmit the computer program 35 as a computer data signal.

Computer program instructions for causing an apparatus to perform at least the following or for performing at least the following:

while in a first state and a second state, simultaneously rendering first audio content associated with a first apparatus and second audio content associated with a second apparatus to a user via a head-mounted audio output system configured for spatial audio rendering, wherein in the first state the second audio content is downmixed to downmixed content and the downmixed content is rendered but not rendered as spatial audio content and the first audio content is rendered as spatial audio content.

Computer program instructions for causing an apparatus to perform at least the following or for performing at least the following:

while in a first state and a second state, simultaneously rendering first audio content associated with a first apparatus and second audio content associated with a second apparatus to a user via a head-mounted audio output system configured for spatial audio rendering, wherein in the first state the second audio content is downmixed to downmixed content and the downmixed content is rendered but not rendered as spatial audio content and the first audio content is rendered as spatial audio content and wherein in the second state the second audio content is rendered without downmixing; and enabling switching between the first state and the second state.

The computer program instructions may be comprised in a computer program, a non-transitory computer readable medium, a computer program product, a machine-readable medium. In some but not necessarily all examples, the computer program instructions may be distributed over more than one computer program.

Although the memory 36 is illustrated as a single component/circuitry it may be implemented as one or more separate components/circuitry some or all of which may be integrated/removable and/or may provide permanent/semi-permanent/dynamic/cached storage.

Although the processor 34 is illustrated as a single component/circuitry it may be implemented as one or more separate components/circuitry some or all of which may be integrated/removable. The processor 34 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and I hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 3, 4, 7-9 may represent steps in a method and/or sections of code in the computer program 35. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user.

The above-described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:

at least one processor; and at least one memory storing instructions that, when executed with the at least one processor, cause the apparatus to perform:

receiving first audio content associated with a first apparatus;

receiving second audio content associated with a second apparatus;

simultaneously rendering the first audio content and the second audio content to a user via a head-mounted audio output system configured for spatial audio rendering, while in a first state, simultaneously render the first audio content and the second audio content to a user via the head-mounted audio output system configured for spatial audio rendering, wherein the first audio content is rendered as spatial audio content and the second audio content is downmixed to downmixed content and the downmixed content is rendered; and while in a second state, simultaneously render the first audio content and the second audio content to the user via the head-mounted audio output system configured for spatial audio rendering, wherein the second audio content is rendered without downmixing; and switch between the first state and the second state, wherein the first apparatus is configured to track movement of a head of a user and the second apparatus is configured to track movement of a head of a user, wherein when the user is focusing on the first apparatus, the apparatus is in the first state and the first apparatus is used for tracking the head of the user; and when the user is focusing on the second apparatus, the apparatus is in the second state and the second apparatus is used for tracking the head of the user.

2. An apparatus as claimed in claim 1 configured to render the first audio content as spatial audio content within an audio space, the audio space remaining in a fixed relationship relative to the first apparatus, wherein the audio space is moved in response to tracked movement, relative to the first apparatus, of the head-mounted audio output system.

3. An apparatus as claimed in claim 1, configured to provide the head-mounted audio output system, wherein the apparatus is a head-mounted apparatus to be worn by the user and is configured for dynamically tracking movement of the user's head.

4. An apparatus as claimed in claim 3, configured to render the first audio content as spatial audio content within an audio space, wherein the audio space is moved in response to data from the first apparatus tracking movement of the head-mounted audio output system.

5. An apparatus as claimed in claim 1, wherein the first audio content received is first spatial audio content associated with first spatial audio information defining variable positions of multiple first audio sources, wherein in a first state the apparatus is configured to render the first spatial audio content using the first spatial audio information to produce the multiple first audio sources at the variable positions defined with the first spatial audio information.

6. An apparatus as claimed in claim 1, wherein the second audio content comprises multiple second audio sources, and wherein in a first state, the apparatus is configured to downmix the second audio content to downmixed content and to render the downmixed content.

7. An apparatus as claimed in claim 1, wherein in a first state the second audio content is downmixed to a single audio source and rendered as the single audio source.

8. An apparatus as claimed in claim 1 configured to render the second audio content as spatial audio content within a second audio space, the second audio space remaining in a fixed relationship relative to the second apparatus, wherein the second audio space is moved in response to tracked movement of the head-mounted audio output system.

9. An apparatus as claimed in claim 1, configured to, in the second state, downmix the first audio content to downmixed audio content and to render the downmixed audio content.

10. An apparatus as claimed in claim 1, wherein the first audio content comprises multiple audio sources, wherein in the second state, the first audio content is downmixed to a single audio source and rendered as the single audio source.

11. An apparatus as claimed in claim 1, wherein the second audio content received is second spatial audio content associated with second spatial audio information defining variable positions of multiple second audio sources, wherein in the second state the apparatus is configured to render the second spatial audio content using the second spatial audio information to produce the multiple second audio sources at the variable positions defined with the second spatial audio information.

12. A method comprising:

simultaneously rendering first audio content associated with a first apparatus and second audio content associated with a second apparatus to a user via a head-mounted shared audio output system configured for spatial audio rendering, while in a first state, simultaneously render the first audio content and the second audio content to a user via the head-mounted shared audio output system configured for spatial audio rendering, wherein the first audio content is rendered as spatial audio content and the second audio content is downmixed to downmixed content and the downmixed content is rendered; and while in a second state, simultaneously render the first audio content and the second audio content to the user via the head-mounted shared audio output system configured for spatial audio rendering, wherein the second audio content is rendered without downmixing; and switch between the first state and the second state, wherein the first apparatus is configured to track movement of a head of a user and the second apparatus is configured to track movement of a head of a user, wherein when the user is focusing on the first apparatus, the apparatus is in the first state and the first apparatus is used for tracking the head of the user; and when the user is focusing on the second apparatus, the apparatus is in the second state and the second apparatus is used for tracking the head of the user.

13. A non-transitory computer readable medium comprising program instructions that, when executed with an apparatus, cause the apparatus to perform at least the following:

simultaneously rendering first audio content associated with a first apparatus and second audio content associated with a second apparatus to a user via a head-mounted audio output system configured for spatial audio rendering, while in a first state, simultaneously render the first audio content and the second audio content to a user via the head-mounted audio output system configured for spatial audio rendering, wherein the first audio content is rendered as spatial audio content and the second audio content is downmixed to downmixed content and the downmixed content is rendered; and while in a second state, simultaneously render the first audio content and the second audio content to the user via the head-mounted audio output system configured for spatial audio rendering, wherein the second audio content is rendered without downmixing; and switch between the first state and the second state, wherein the first apparatus is configured to track movement of a head of a user and the second apparatus is configured to track movement of a head of a user, wherein when the user is focusing on the first apparatus, the apparatus is in the first state and the first apparatus is used for tracking the head of the user; and when the user is focusing on the second apparatus, the apparatus is in the second state and the second apparatus is used for tracking the head of the user.

* * * * *